(12) United States Patent
Hertel Nilsson Van Kalken

(10) Patent No.: US 11,719,220 B2
(45) Date of Patent: Aug. 8, 2023

(54) METHOD OF MANUFACTURING A WIND TURBINE BLADE AND A WIND TURBINE BLADE THEREOF

(71) Applicant: LM WIND POWER US TECHNOLOGY APS, Kolding (DK)

(72) Inventor: Jordy Hertel Nilsson Van Kalken, Kolding (DK)

(73) Assignee: LM WIND POWER US TECHNOLOGY APS, Kolding (DK)

(*) Notice: Subject to any disclaimer, the term of this patent is extended or adjusted under 35 U.S.C. 154(b) by 757 days.

(21) Appl. No.: 16/615,665

(22) PCT Filed: May 22, 2018

(86) PCT No.: PCT/EP2018/063377
§ 371 (c)(1),
(2) Date: Nov. 21, 2019

(87) PCT Pub. No.: WO2018/215460
PCT Pub. Date: Nov. 29, 2018

(65) Prior Publication Data
US 2020/0116122 A1  Apr. 16, 2020

(30) Foreign Application Priority Data
May 22, 2017  (EP) ..................... 17172221

(51) Int. Cl.
*F01D 1/06* (2006.01)
*F03D 1/06* (2006.01)
(Continued)

(52) U.S. Cl.
CPC ............ *F03D 1/0633* (2013.01); *B29C 64/10* (2017.08); *F03D 1/0675* (2013.01);
(Continued)

(58) Field of Classification Search
CPC ........ F03D 1/0633; F03D 1/0675; F03D 1/06; B29C 64/10; B33Y 80/00;
(Continued)

(56) References Cited

U.S. PATENT DOCUMENTS 9,347,433 B2   5/2016  Schellstede
10,823,139 B2 * 11/2020  Hallissy ................ F03D 1/0675
(Continued)

FOREIGN PATENT DOCUMENTS

CN   101559652 A   10/2009
CN   101842584 A   9/2010
(Continued)

OTHER PUBLICATIONS

International Search Report dated Jul. 11, 2018 issued in corresponding International Application No. PCT/EP2018/063377.

*Primary Examiner* — Woody A Lee, Jr.
*Assistant Examiner* — Joshua R Beebe
(74) *Attorney, Agent, or Firm* — Nath, Goldberg & Meyer; Jerald L. Meyer; Tanya E. Harkins

(57) ABSTRACT

This invention relates to a method and a wind turbine blade, wherein one or more airflow modifying devices are attached to a wind turbine blade having a base aerodynamic profile. The base aerodynamic profile is configured to substantially carry the structural loading of this modified wind turbine blade. The airflow modifying device is manufactured via 3D-printing and/or via 3D-machining and optionally coated or laminated before attachment. Once attached, the airflow modifying device may further be coated or laminated before working the outer surfaces into their finished shape.

17 Claims, 8 Drawing Sheets

(51) Int. Cl.
*B29C 64/10* (2017.01)
*B33Y 80/00* (2015.01)
*B29L 31/08* (2006.01)

(52) U.S. Cl.
CPC ......... *B29L 2031/085* (2013.01); *B33Y 80/00* (2014.12); *F05B 2230/10* (2013.01); *F05B 2230/30* (2013.01); *F05B 2230/50* (2013.01); *F05B 2230/80* (2013.01); *F05B 2230/90* (2013.01); *F05B 2240/302* (2013.01); *F05B 2250/611* (2013.01)

(58) Field of Classification Search
CPC ............ B20L 2031/085; F05B 2230/10; F05B 2230/30; F05B 2230/50; F05B 2230/80; F05B 2230/90; F05B 2240/302; F05B 2250/611
See application file for complete search history.

(56) References Cited

U.S. PATENT DOCUMENTS

| | | | |
|---|---|---|---|
| 2012/0061522 A1 | 3/2012 | Sullivan et al. | |
| 2014/0186175 A1* | 7/2014 | Baehmann | F03D 1/0675 416/1 |
| 2014/0271213 A1* | 9/2014 | Yarbrough | F03D 1/0641 416/223 R |
| 2015/0056081 A1* | 2/2015 | De Waal Malefijt | B29C 31/00 156/500 |
| 2015/0078913 A1 | 3/2015 | Enevoldsen et al. | |
| 2015/0322791 A1* | 11/2015 | Flach | F03D 1/0675 156/60 |
| 2016/0177915 A1* | 6/2016 | Gonzalez | F03D 1/0675 416/223 R |

FOREIGN PATENT DOCUMENTS

| | | | | |
|---|---|---|---|---|
| CN | 102536630 A | | 7/2012 | |
| DE | 102013101232 A1 | * | 8/2013 | ......... F03D 1/0683 |
| DE | 102013101232 A1 | | 8/2013 | |
| DE | 102014203442 A1 | | 5/2015 | |
| EP | 2182203 A2 | | 5/2010 | |
| EP | 2182203 A2 | * | 5/2010 | ......... F03D 1/0675 |
| EP | 2740583 A1 | | 6/2014 | |
| EP | 2740583 A1 | * | 6/2014 | ......... B29C 65/5014 |
| EP | 2778392 A1 | | 9/2014 | |
| EP | 2742233 B1 | | 9/2015 | |
| WO | 2013/130161 A1 | | 9/2013 | |
| WO | 2013130161 A1 | | 9/2013 | |
| WO | 2015056081 A1 | | 4/2015 | |

* cited by examiner

METHOD OF MANUFACTURING A WIND TURBINE BLADE AND A WIND TURBINE BLADE THEREOF

This is a National Phase Application filed under 35 U.S.C. 371 as a national stage of PCT/EP2018/063377, filed May 22, 2018, an application claiming the benefit of European Application No. 17172221.8, filed May 22, 2017, the content of each of which is hereby incorporated by reference in its entirety.

TECHNICAL FIELD

The present invention relates to a method of manufacturing a device for modifying the aerodynamic profile of a wind turbine blade, wherein the device has a complex aerodynamically shaped profile defining an outer surface and an opposite contact surface which is shaped to follow the aerodynamic profile of the wind turbine blade.

The present invention further relates to a device as described above, a method of modifying the aerodynamic profile of the wind turbine blade, and a wind turbine blade thereof.

BACKGROUND

It is well-known that pre-manufactured wind turbine blades can be fitted with various types of devices modifying the aerodynamic profile of the wind turbine blade. U.S. Pat. No. 9,347,433 B1 discloses a dual set of wind turbine blades, wherein each wind turbine blade comprises a plurality of separately manufactured tubercles which are attached to the leading edge of the wind turbine blade.

It is further known that riblet shaped films can be manufactured using a master tool, where such riblet films can be attached to the blade surface towards the trailing edge via an adhesive layer applied to this riblet film, as disclosed by Leonardo P. Chamorro, et al. The riblet film should be arranged at the outer half, preferably outer 25%, of the wind turbine blade for optimal power production.

It is also known that airflow modifying devices can be attached by creating a recess in the outer surface of the blade shell and placing the airflow modifying device in that recess, as described in EP 2742233 B1. The recess can be formed by removing material from the finished outer surface, however, this reduces the structural integrity of the blade shell. The recess can also be formed by use of a template which is placed on the outer surface before the finishing step and then removed after completion of the finishing step. This requires a precise placement of the template and adds extra steps to the manufacturing process.

The wind turbine blade can be manufactured by laying up layers of a laminate of a fibre material in a mould, resin is then introduced into the fibre material, and finally cured to form a cured blade shell part with a desired aerodynamic profile. A core material may be arranged between two sets of layers of fibre material to form a sandwich structure. The cured blade shell parts can then be joined together via an adhesive to form the wind turbine blade, after which the outer surfaces of the combined blade shell are worked into their finished shape.

Devices modifying the aerodynamic profile may also be integrated into the wind turbine blade during manufacture. US 2012/061522 A1 discloses such a wind turbine blade having a wave-shaped profile extending in the longitudinal direction, wherein the wave pattern is integrated into both the pressure side and the suction side. Each wave extends between the leading edge and the trailing edge. WO 2013/130161 A1 also discloses such a wind turbine blade having two blade shell parts which are jointed at the trailing and leading edges respectively, wherein both shell parts have a wave-shaped leading edge profile.

Integrating such devices requires a mould with a moulding surface uniquely shaped to form the modified aerodynamic profile of the wind turbine blade. This modified aerodynamic profile can also be formed by placing positive mould inlays on the moulding surface and/or by integrating negative mould elements into the moulding surface. Layers of a fibre material are then applied onto these mould inlays and/or inside these mould elements, infused with resin, and finally cured to integrally form the devices. However, this requires a complex and time-consuming lay-up process and increases the risk of wrinkles occurring in the cured blade shell.

These aerodynamic profile modifying devices are typically designed to e.g. increase the aerodynamic performance, reduce trailing edge vortices and noises thereof, protect the wind turbine blade against lightning strikes or erosion, or reduce the accumulation of ice on the wind turbine blade. The complexity of the aerodynamic profile of such devices may thus vary dependent on its desired purpose. However, integrating airflow modifying devices having a complex aerodynamic profile is very difficult to achieve using conventional lay-up techniques.

EP 2778392 A1 discloses a wind turbine blade with an airfoil modifying device attached to the suction side and/or the pressure side, wherein the airfoil modifying device has a solid continuous body or a hollow body. The airflow modifying device is arranged at the trailing edge of the wind turbine blade for providing a modified flatback profile, wherein the airfoil modifying device is attached using an adhesive layer or mechanical fasteners.

OBJECT OF THE INVENTION

An object of the invention is to provide a method and a wind turbine blade that solves the abovementioned problems.

Another object of the invention is to provide a method and a wind turbine blade that allows for a simple and cheap production of airflow modifying devices having a complex aerodynamic profile.

Yet another object of the invention is to provide a method and a wind turbine blade that reduces the total manufacturing time.

DETAILED DESCRIPTION OF THE INVENTION

An object of the invention is achieved by a method of manufacturing a device for modifying an aerodynamic profile of a wind turbine blade, the wind turbine blade having a base aerodynamic profile, wherein the method comprises:

manufacturing a device configured to be attached to the wind turbine blade, wherein the device comprises a body having at least one outer surface and at least one contact surface, the at least one contact surface is shaped to substantially follow the contour of said base aerodynamic profile, when attached, wherein the body forms a complex profile extending in a chordwise direction and further in a longitudinal direction, the complex profile is configured to modify said base aerodynamic profile of the wind turbine blade, when attached, characterised in that said device is manufactured by three-dimensional printing and/or by three-dimensional machining of a base element of said device, and wherein at least one layer of fibre material or a coating is applied over at least a portion of said at least one outer surface.

This provides a cheap and simple method of manufacturing devices having a complex profile configured to modify the aerodynamic profile of a wind turbine blade. The present method is particularly suitable for serial production of devices with a complex profile. This allows the present device to be manufactured separately from the wind turbine blade in a controlled environment, e.g. using an automated manufactured process. No need for casting the device directly on the pre-manufactured wind turbine blade using specially designed moulds, such as disclosed in US 2012/0313291 A1. The present method may advantageously be used to manufacture and attach devices having an advanced aerodynamic profile which is too complex to be integrally formed during manufacture of the wind turbine blade using conventional lay-up processes.

The present device is configured to alter the aerodynamic or structural performance of the wind turbine blade during operation. For example, the device may function as an advanced airflow straightener or modifier, a lift-to-drag ratio improving device, or a stall or post-stall control device. Each of which may have a complex profile, e.g. a substantially three-dimensional (3D) profile, extending in the chordwise and longitudinal directions. Here, the term "complex" is understood as a structure with an outer surface gradient that changes significantly along both a chordwise length and a longitudinal length. The dimensions of this 3D-profile may be selected dependent on the dimensions of the base aerodynamic profile of the wind turbine blade. In example, the radius of the complex profile may in the chordwise direction and/or longitudinal direction be no more than 3 times the leading edge radius of the local chordwise curvature of the base profile of the wind turbine blade. In example, conventional leading edge tubercles have a local surface curvature located within a lower boundary range while the present device has a surface curvature located within an upper boundary range above this lower boundary range.

Conventional high-volume manufacturing techniques, such as extrusion or castings, may use 3D-printed moulds or dies in which the conventional devices can be moulded. However, conventional moulding processes have restrictions in regards to the complexity of the profile which can be produced. Therefore, devices manufactured by such conventional methods have a simple profile, e.g. a two-dimensional (2D) profile, with a uniform cross-sectional profile extending in the chordwise or longitudinal direction. Conventional elongated stall barriers and the airfoil modifying device of EP 2778392 A1 are examples of such a 2D-profile. Such 2D profiles have a substantially constant surface gradient in said chordwise or longitudinal direction while the surface gradient may vary in the other direction.

According to one embodiment, said device is manufactured by three-dimensional printing of a base element of the device, which is substantially three-dimensional machined into the second profile.

The present device may be printed into the desired complex profile using three 3D-printing. Here, '3D-printing' is defined as application of successive layers of powders, filaments, wires or resin to form the desired 3D-profile. The device may also be machined into the desired profile using 3D-machining. Here, '3D-machining' is defined as removal of material from a base element to shape the base element into the desired 3D-profile, including milling, laser cutting, or waterjet cutting. Said base element may, for example, be a raw mass or block with an arbitrary profile which are then machined into the final profile. The base element may also be a 3D-printed element with a crude profile which is then machined into the final profile. This provides a cheap and simple way of manufacturing devices with any complex profile for modifying the aerodynamic profile of the wind turbine blade. This eliminates the need for complicated lay-up processes or the use of separate mould inlays or mould elements, thereby reducing the total manufacturing costs and time.

A model, e.g. a computer-aided design (CAD) model, of the wind turbine blade may be used to manufacture the present device. Alternatively, a male or positive mould of the wind turbine blade, optionally a portion thereof, may be used to manufacture the present device.

According to one embodiment, said at least one layer of fibre material is infused or injected with a thermoplastic binder or a thermoset resin.

At least one layer of a fibre material may be arranged on at least the outer surfaces of the present device. Said at least one layer may further extend along the contact surfaces of the device. A plurality of layers may be arranged on the outer surfaces and, optionally, along the contact surfaces, thereby forming a laminate of fibre material. The layer or laminate may be used in combination with a coating, as mentioned below. For example, the device may be pre-laminated and then coated, or vice versa. The device may thus be attached by overlamination which provides a smooth seamless transition.

The fibres may in example be glass fibres, carbon fibres, or a mixture of carbon fibres and glass fibres.

The layer(s) may be applied using a lay-up process, after which a thermoset resin or thermoplastic binder may be introduced into the layers, e.g. using vacuum infusion (VARTM) or resin injection (RTM), and finally cured. Alternatively, the resin or binder may be introduced before the lay-up, thereby forming a pre-formed structure suitable to be shaped to follow the second profile of the device.

The layer(s) may be applied before attachment so that the layer(s) may extend along the outer surfaces and, optionally, further along the contact surfaces of the device. The device may thus be pre-laminated separately from the wind turbine blade. This may in some instances allow for a more controlled lay-up.

According to one embodiment, a coating is further applied over said at least one layer.

A protective coating may be applied directly to at least the outer surfaces of the device, or a main portion thereof, or over the above fibre layer(s), i.e. layers of fibre material. The coating may further be applied to all surfaces of the device, including the outer surfaces and the contact surfaces. Any application technique may be used to apply the coating, e.g. spraying or painting. This allows the exterior surfaces of the device to be protected from any environmental impacts, erosion or wear.

The coating may be a gelcoat comprising polymer, urethane, polyester or another suitable material. Optionally, a finishing layer of paint may further be applied to the coated layer.

The coating may be performed before the present device has been attached to the wind turbine blade. The coating may thus cover the exterior surfaces and, optionally, further the contact surfaces, thereby forming a protective layer which, partly or fully, extends around the device. The device may thus be pre-coated before attachment.

An object of the invention is also achieved by a device for modifying an aerodynamic profile of a wind turbine blade, the device comprising a body forming a complex profile extending in a chordwise direction and further in a longitudinal direction, the body has at least one outer surface and at least one contact surface, the device is configured to modify a base aerodynamic profile of the wind turbine blade, when attached, wherein the at least one contact surface is shaped to substantially follow a contour of said base aerodynamic profile of the wind turbine blade, characterised in that at least one layer of fibre material or a coating extends over at least a portion of said at least one outer surface.

This provides a device suitable for modifying the aerodynamic profile of a wind turbine blade, wherein the device is configured to be attached to the wind turbine blade. The device has a complex profile adapted for a particular aerodynamic purpose and/or to a particular installation location on the wind turbine blade. This allows the device to comprise a simple and lightweight structure having a complex profile, e.g. advanced 3D-profile, compared to conventional devices integrally formed in the wind turbine blade.

The device has a local length measured in the longitudinal direction, a local width measured in the chordwise direction, and a local height measured in a thickness direction. The outer surface of the device has a local surface gradient that varies along the local length and further along the local width.

The device advantageously has one or more contact surfaces with a surface profile substantially matching the local blade profile at the desired installation location. The contact surfaces may, for example, be formed by a base part of the present device. This allows the device to follow the aerodynamic profile of the wind turbine blade and thus form a substantially tight fit.

The base part may have a tapered edge profile forming the peripheral edge of the device. The local thickness of the edge profile may taper from a first thickness located towards the centre of the device and to a second thickness located at or near the peripheral edge. The peripheral edge may in example have a rounded or chamfered edge. This allows for a smooth transition and a more optimal airflow over the transition area.

The present device further has one or more outer surfaces with a surface profile defined by its 3D-profile. The outer surfaces may, for example, be shaped by the body which forms an aerodynamic part of the present device. The aerodynamic part may be 3D-printed onto the base part. Alternatively, the aerodynamic part and the base part may be integrally formed to a single piece. This allows the device to have an advanced surface profile adapted to modify the aerodynamic airflow over the wind turbine blade.

In an alliterative embodiment, the present device may be manufactured directly on the wind turbine blade using any suitable technique. The aerodynamically shaped body may thus be manufactured on the blade surface of the base profile of the wind turbine blade. A protective coating or layer(s) of a fibre material may be arranged on the transition areas and/or the outer surfaces, as mentioned above. The present device may thus be manufactured and attached directly onsite.

According to one embodiment, said body is made of a plastic material or composite, a foam material or composite, or a fibre reinforced material or composite.

The device, or body thereof, may be made of a plastic material or composite, such as polymer, polyamide, polyester, polypropylene, elastomer or resin. For example, but not limited to, acrylonitrile butadiene styrene (ABS), polylactic acid (PLA), polyethylene (e.g. HDPE). SLS Nylon®, rigid opaque plastics (e.g. Vero) or rubber-like plastics (e.g. Tango or Agilus). The device or body may also be made of a foam material or composite, such as polymer, polyurethane, polyethylene, PVC or epoxy. The device or body may also be made of a fibre-reinforced material or composite, such as fibre-reinforced Nylon® or fibre-reinforced polymer, wherein said fibres may be made of carbon, glass, aramid or Kevlar®. The device or body may also be made of a metal or metal alloy, such as titanium, stainless steel, iron, aluminium, or cobalt chrome. Alternatively, the device may be made of a mixture of materials, such as Alumide®.

According to one embodiment, said device comprises a first sub-device and a second sub-device, wherein the first sub-device and the second sub-device are configured to be jointed together and/or to the wind turbine blade.

The device may comprise a first sub-device and at least a second sub-device which are joined together and/or joined to the wind turbine blade, e.g. via an adhesive layer, a mechanical coupling or fasteners, or by overlamination. The first and second sub-devices may be arranged at opposite side surfaces or edges of the wind turbine blade. The device may alternatively be a single continued device. The continuous device may enclose a tip end of the wind turbine blade, or extend over a leading edge portion of the wind turbine blade. The continuous device may also extend over a portion of the pressure side and/or the suction side of the wind turbine blade.

The present device is advantageously manufactured as a separate piece, allowing for a faster and cheap serial production. The present device can further be provided with an advanced 3D-profile allowing for a more optimised control of the airflow over the wind turbine blade.

An object of the invention is further achieved by a method of modifying an aerodynamic profile of a wind turbine blade, the wind turbine blade having a length of at least 35 meters measured between a blade root and a tip end, wherein the method comprising the steps of:
  laying up at least one layer of a fibre material in a mould,
  introducing a resin into said at least one layer of fibre material, e.g. using vacuum infusion (VARTM) or resin injection (RTM),
  substantially curing said resin in the fibre material to form at least one cured blade part of the wind turbine blade,
  working a side surface of said at least one cured blade part into a finished outer surface defining a pressure or suction side of the wind turbine blade, characterised in that, the method further comprises the steps of:
  attaching at least one device, as described above, to the at least one cured blade part by applying at least one layer of fibre material over at least a portion of the at least one outer surface and further over a portion of the side surface of the at least one cured blade part, wherein said at least one layer of fibre material is infused or injected with a thermoplastic binder or a thermoset resin.

The present method is particularly suitable for manufacturing wind turbine blades having a blade length measured from a blade root to a tip end of at least 35 meters, preferably at least 50 meters. The wind turbine blade may, for example, comprise two or more blade parts, e.g. blade shell parts, which are joined together during manufacturing. The wind turbine blade may also comprise two or more blade parts, e.g. blade sections, which are joined together after manufacturing.

The wind turbine blade or blade parts are advantageously manufactured with a base aerodynamic profile, e.g. an unmodified profile with no devices attached or integrally formed, thereby simplifying the manufacturing process and costs. The aerodynamic profile of the wind turbine blade may thus be modified without affecting the structural integrity of the blade shell.

The wind turbine blade is configured to carry substantially all the structural loads during operation while the layer or laminate applied to the outer surfaces of the present device are not configured to carry any high structural loads during operation. Dependent on the particular profile and structure of the present device, the device, e.g. the layer or laminate applied to the outer surfaces, may alternatively carry a limited amount of structural loads during operation.

The term "working" includes any finishing, such as grinding, polishing, coating and/or painting of the outer surfaces of the device and/or of the wind turbine blade.

The individual fibre layers of above laminate may form a first peripheral edge arranged on the blade surface, which extends in the chordwise and/or longitudinal direction. The first peripheral edge may have a tapered edge profile, thereby forming a smooth transition on the blade surface. The individual fibre layers of above laminate may further form a second peripheral edge arranged on the outer surface of the device, which also extends in the chordwise and/or longitudinal direction. The first peripheral edge may further have a tapered edge profile, thereby forming a smooth transition on the outer surface of the device. This provides a smooth transition that requires a minimal of working.

According to one embodiment, said at least one cured blade part comprises a first blade part and a second blade part, wherein the at least one device is attached before or after joining said first and second blade parts.

The present device may be attached in a post-moulding process during the manufacture of the wind turbine blade. For example, the attachment of the present device may be performed before joining the two blade shell parts together or before working the joined blade shell parts into their finished outer shape.

The outer surfaces of the device and of the wind turbine blade may then be worked into their final shape in a combined step, thereby saving time and reducing the total number of process steps. A transition area between the device and the wind turbine blade may be thus worked into a smooth aerodynamic profile, thereby minimizing any abrupt changes in the airflow. Here, the transition area' includes the peripheral edge surface of the device, an adjoining outer surface portion of the device, and an adjoining blade surface portion of the wind turbine blade.

The present method may also suitably be implemented as a post-manufacturing process, e.g. after working the joined blade shell parts into their finished outer shape or after joining the blade sections together. The coating or painting applied during the finishing step may be omitted from the installation area of the device, or removed prior to attachment of the device. The outer surfaces of the device may then be worked into their finish shape in a second or supplementary working step. This second or supplementary working step may include working the transition area into a smooth transition profile as mentioned above.

The device may be manufactured and/or worked into its finished shape separately of the wind turbine blade. The finished device may then be transported to the site of the wind turbine blade, and then attached to the wind turbine blade without the use of specially designed moulds. The device may also be attached to the wind turbine blade before transportation.

The above post-manufacturing process or post-moulding process may include applying the coating over the worked outer surface of the device and at least the adjoining worked blade surface portions. This may allow for a uniform application and thus thickness of the coating.

According to one embodiment, said at least one device comprises a first sub-device and a second sub-device, wherein the first sub-device is arranged on the suction side and the second sub-device is arranged on the pressure side.

The individual sub-devices may be joined before or during the attachment of the present device. Each sub-device has a local contact surface for contacting another sub-device, wherein the sub-devices may be adhered together or mechanically attached via a suitable mechanical coupling or by fasteners. Alternatively, the sub-devices may be joined by applying one or more overlaminates over the transition area between the two sub-devices. Each overlaminate comprises one or more layers of fibre material which are infused or injected with a thermoplastic binder or a thermoset resin. The thermoplastic binder or thermoset resin is then cured or heated to form the overlapping joint. This provides a smooth transition which reduces the impact on the aerodynamic performance.

Alternatively or additionally, the individual sub-devices may be attached to the blade surface of the wind turbine blade in a similar manner.

The present device may additionally be attached in its installation location using an adhesive. The adhesive may in example be a fluid adhesive or an adhesive film or tape. The adhesive may be applied to the contact surfaces of the device and/or to the matching local blade surfaces of the wind turbine blade. A removable cover layer may protect the adhesive before attachment. For example, the device may initially be held in place by adhesive and then attached by applying a laminate of fibre layers over the transition area. This allows for a quick and simple attachment.

Optionally, an installation tool may be used to correctly align the device on the wind turbine blade during attachment. The installation tool may comprise means, e.g. a cavity, for receiving the device prior to alignment. The installation tool may further comprise means, e.g. reference markings or spacer elements, for placing the device in its correct installation location on the wind turbine blade, e.g. on the blade shell part or the blade section. Once the device has been attached, the installation tool may then be removed. This allows for an accurate placement of the device on multiple wind turbine blades.

In an alternative embodiment, the present device may be manufactured directly on the wind turbine blade using any suitable manufacturing process. A protective coating or layer(s) of a fibre material may subsequently be applied over the device, as mentioned above.

An object of the invention is additionally achieved by a wind turbine blade for a wind turbine, the wind turbine blade extending in a longitudinal direction from a blade root to a tip end and further in a transverse direction from a leading edge to a trailing edge, the wind turbine blade having a length of at least 35 meters measured between the blade root and the tip end, wherein the wind turbine blade comprising an aerodynamic profile which defines at least one side surface arranged between said leading edge and said trailing edge, wherein a number of devices is attached to the wind turbine blade, each device comprises a body forming a profile configured to modify the base aerodynamic profile of the wind turbine blade, the body defines at least one outer surface facing away from said at least one side surface and at least one contact surface facing said at least one side surface, characterised in that said aerodynamic profile is a base aerodynamic profile, and at least one of said devices is configured as described above.

This provides a wind turbine blade with a base aerodynamic profile which can easily be adapted to a particular application by attaching one or more devices as described earlier. The wind turbine blade may advantageously to be manufactured with an unmodified aerodynamic profile, as described earlier, thereby reducing the total manufacturing time and costs. The devices may advantageously be attached to this unmodified aerodynamic profile. This allows the aerodynamic performance of the wind turbine blade to be enhanced by attachment of said devices.

The base wind turbine blade may be configured to carry the structural loading of the modified wind turbine blade once the present devices have been attached. The devices may thus influence both the airflow over the wind turbine blade and the structural loadings thereof in a favourable manner. Any reinforcements needed may thus be integrated into the base wind turbine blade during the manufacture.

The present devices are advantageously attached by over-lamination, as described earlier, to provide a smooth aerodynamic transition and reduce the risk of the device separating from the blade surface.

According to one embodiment, said at least one of the devices is positioned between 0% to 50% of the chord length from the leading edge.

The present device may be arranged on the pressure side of the wind turbine blade and/or the suction side of the wind turbine blade. The devices may be positioned at a distance from the leading edge, e.g. between 0% to 50% of the chord length measured from the leading edge, preferably between 0% to 25% or between 0% to 10%. This allows the device to guide or control the local airflow over the respective blade surface.

Alternatively, the present device may be arranged at a leading edge area, e.g. extend over the leading edge and further along a portion of the pressure and/or suction side. Optionally, the present device may also be arranged at a trailing edge area, e.g. extend over the trailing edge and further along a portion of the pressure and/or suction side. This allows the device to guide or control the incoming airflow or existing airflow.

The present device may further be positioned on the blade root portion, the transition portion or the aerodynamic portion of the wind turbine blade. For example, the device may be positioned between 33% to 100% of the blade length measured from the blade root, preferably between 67% to 100%. Alternatively, the device may be positioned between 0% to 33% of the blade length measured from the blade root, preferably between 5% to 25%. This allows the device to be installed at a lengthwise position for guiding or controlling the airflow over a predetermined portion of the wind turbine blade.

According to one embodiment, said number of devices comprises an array of devices, wherein said array of devices extends along the leading edge or the at least one side surface.

The wind turbine blade may suitably be fitted any number of devices arranged in an array. The individual devices within the array may have the same or different second profiles. The individual devices may further be spaced apart or in a continuous array. An array of devices may be arranged on one or both of the trailing and leading edges and/or on one or both of the pressure and suction sides.

The individual devices within the array may all have the dimensions and/or complex profile. Alternatively, the dimensions and/or complex profile of each individual device may differ along the length of the array. Alternatively, the dimensions and/or complex profile of one group of devices may differ from the dimensions and/or complex profile of another group of devices.

In example, the device may be a leading edge device, such as an aerodynamic turbulator, an airflow straightener, a bump or wedge, a leading edge tubercle or a device for changing the inflow angle-of-attack (AoA). This leading edge device may have an complex aerodynamic profile, as described earlier. This allows the device to influence the airflow in the boundary layer and in some instances delay stall or transition into turbulent airflow and thereby improve the lift-to-drag ratio.

In example, the device may be a side surface device for arrangement on the pressure and/or suction side. This side surface device may have a local crest and/or a local trough projecting from the respective side surface of the wind turbine blade. For example, the side surface device may have a sinuously shaped outer surface. This allows the device to control the airflow in the longitudinal direction and enhance the aerodynamic or structural performance during operation.

According to one embodiment, said number of devices comprises a device arranged at the tip end, wherein the at least one contact surface is shaped to enclose an original tip end of the wind turbine blade, and the complex profile is shaped to form either an extended tip end profile or a modified tip end profile.

The device may also be a tip end device configured to be arranged at the tip end of the wind turbine blade. The contact surfaces of this tip end device may be shaped to follow the original tip end profile. The complex profile of the tip end device may be shaped to form a modified tip end profile or an extended tip end profile.

The tip end device may be configured to withstand wind loads, deformation of the tip end area, or other loads affecting the tip end. This may be achieved by applying a laminate of fibre material over the device, e.g. at least along the transition area, and further along the adjoining blade surfaces of the original tip end. Optionally, an adhesive may be arranged between the contact surfaces of the device and the blade surfaces of the original tip end. Alternatively, the device may be attached using mechanical fasteners, such as bolts, screws or rivets.

The tip end device may comprise two or more sub-devices configured to be joined together in order to enclose the original tip end. For example, an upper sub-device may be arranged at the suction side and a lower sub-device may be arranged at the pressure side, wherein the upper and lower sub-devices are attached to the wind turbine blade and/or attached to each other. This allows for easier handling and attachment of the tip end device.

Optionally, one or more additional elements may be integrated into the device, e.g. the tip end device, before or after attachment. For example, a lightning protection system and/or a drain water system may be integrated in the body and/or the outer surface of the device. The lightning protection system and/or the drain water system may be coupled to a corresponding system in the wind turbine blade. The body of the device may be a solid or hollow body shaped to form the complex profile.

DESCRIPTION OF DRAWINGS

The invention is explained in detail below with reference to embodiments shown in the drawings, in which.

LIST OF REFERENCES

Figure 1:
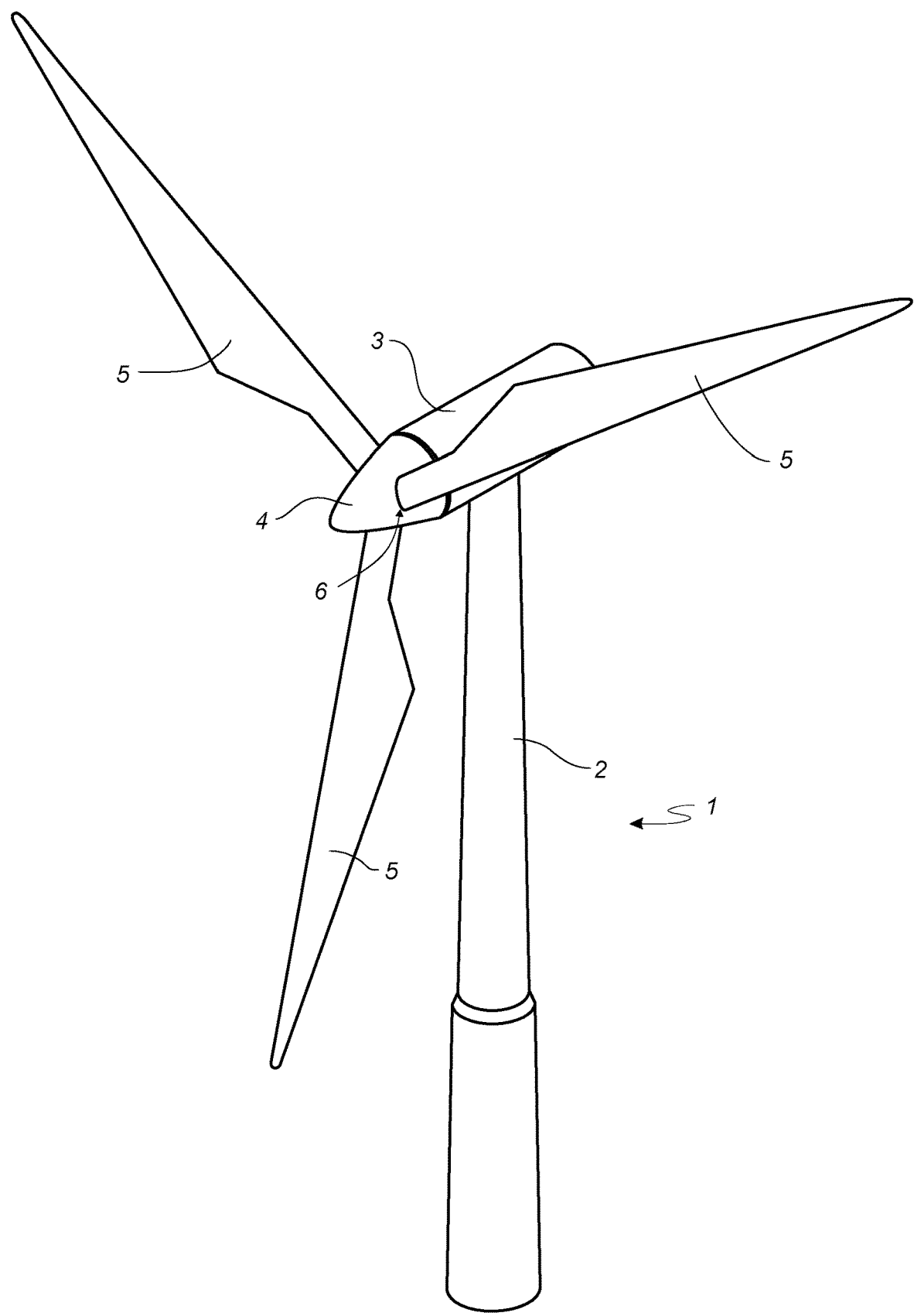
FIG. 1 shows a wind turbine.

1. Wind turbine
2. Wind turbine tower
3. Nacelle
4. Hub
5. Wind turbine blades
6. Pitch bearing
7. Blade root
8. Tip end
9. Leading edge
9a. Leading edge area
10. Trailing edge
10a. Trailing edge area
11. Blade shell
12. Pressure side
13. Suction side
14. Blade root portion
15. Aerodynamic blade portion
16. Transition portion
17. Blade length of wind turbine blade
18. Chord length of wind turbine blade
19. Device
19a. First sub-device
19b. Second sub-device
20. Contact surface of device
21. Outer surface of device
21a. Transition area
22a. First devices
22b. Second devices
23. Device
24. Body of the device
25. Protective layer
26. Device
27. Inner chamber of the device
28. Original tip end
29a. First sub-device
29b. Second sub-device
30. Manufacture of wind turbine blade
31. Manufacture of device
31a. Base element
32. Attachment of device
33. Coating or lamination of outer surfaces
34. Working of outer surfaces into finished shape The listed reference numbers are shown in abovementioned drawings where no all reference numbers are shown on the same figure for illustrative purposes. The same part or position seen in the drawings will be numbered with the same reference number in different figures.

DETAILED DESCRIPTION OF THE DRAWINGS

FIG. 1 shows a modem wind turbine 1 comprising a wind turbine tower 2, a nacelle 3 arranged on top of the wind turbine tower 2, and a rotor defining a rotor plane. The nacelle 3 is connected to the wind turbine tower 2, e.g. via a yaw bearing unit. The rotor comprises a hub 4 and a number of wind turbine blades 5. Here three wind turbine blades are shown, but the rotor may comprise more or fewer wind turbine blades 5. The hub 4 is connected to a drive train, e.g. a generator, located in the wind turbine 1 via a rotation shaft.

The hub 4 comprises a mounting interface for each wind turbine blade 5. A pitch bearing unit 6 is optionally connected to this mounting interface and further to a blade root of the wind turbine blade 5.

Figure 2:
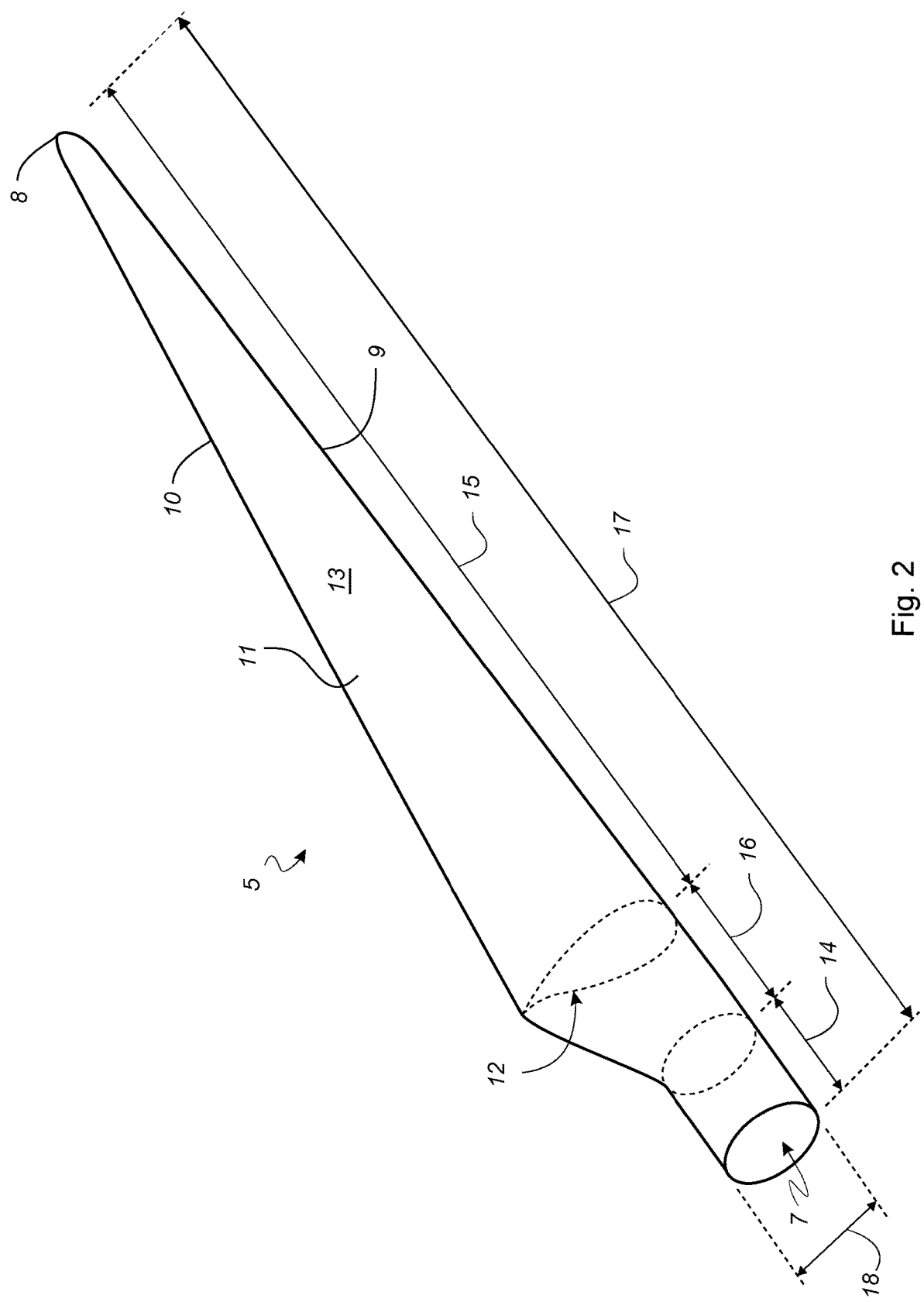
FIG. 2 shows an exemplary embodiment of the wind turbine blade having a base aerodynamic profile.

FIG. 2 shows a schematic view of the wind turbine blade 5 which extends in a longitudinal direction from a blade root 7 to a tip end 8. The wind turbine blade 5 further extends in a chordwise direction from a leading edge 9 to a trailing edge 10. The wind turbine blade 5 comprises a blade shell 11 having two opposite facing side surfaces defining a pressure side 12 and a suction side 13 respectively. The blade shell 11 further defines a blade root portion 14, an aerodynamic blade portion 15, and a transition portion 16 between the blade root portion 14 and the aerodynamic blade portion 15.

The blade root portion 14 has a substantially circular or elliptical cross-section (indicated by dashed lines). The blade root portion 14 together with a load carrying structure, e.g. a main laminate combined with a shear web or a box beam, are configured to add structural strength to the wind turbine blade 5 and transfer the dynamic loads to the hub 4. The load carrying structure extends between the pressure side 12 and the suction side 13 and further in the longitudinal direction.

The blade aerodynamic blade portion 15 has an aerodynamically shaped cross-section (indicated by dashed lines) designed to generate lift. The cross-sectional profile of the blade shell 11 gradually transforms from the circular or elliptical profile into the aerodynamic profile in the transition portion 16.

The wind turbine blade 5 has a blade length 17 of at least 35 metres, preferably at least 50 metres, measured in the longitudinal direction. The wind turbine blade 5 further has a chord length 18 as function of the blade length 17 measured in the chordwise direction, wherein the maximum chord length is found between the blade aerodynamic blade portion 15 and the transition portion 16.

Figure 3:
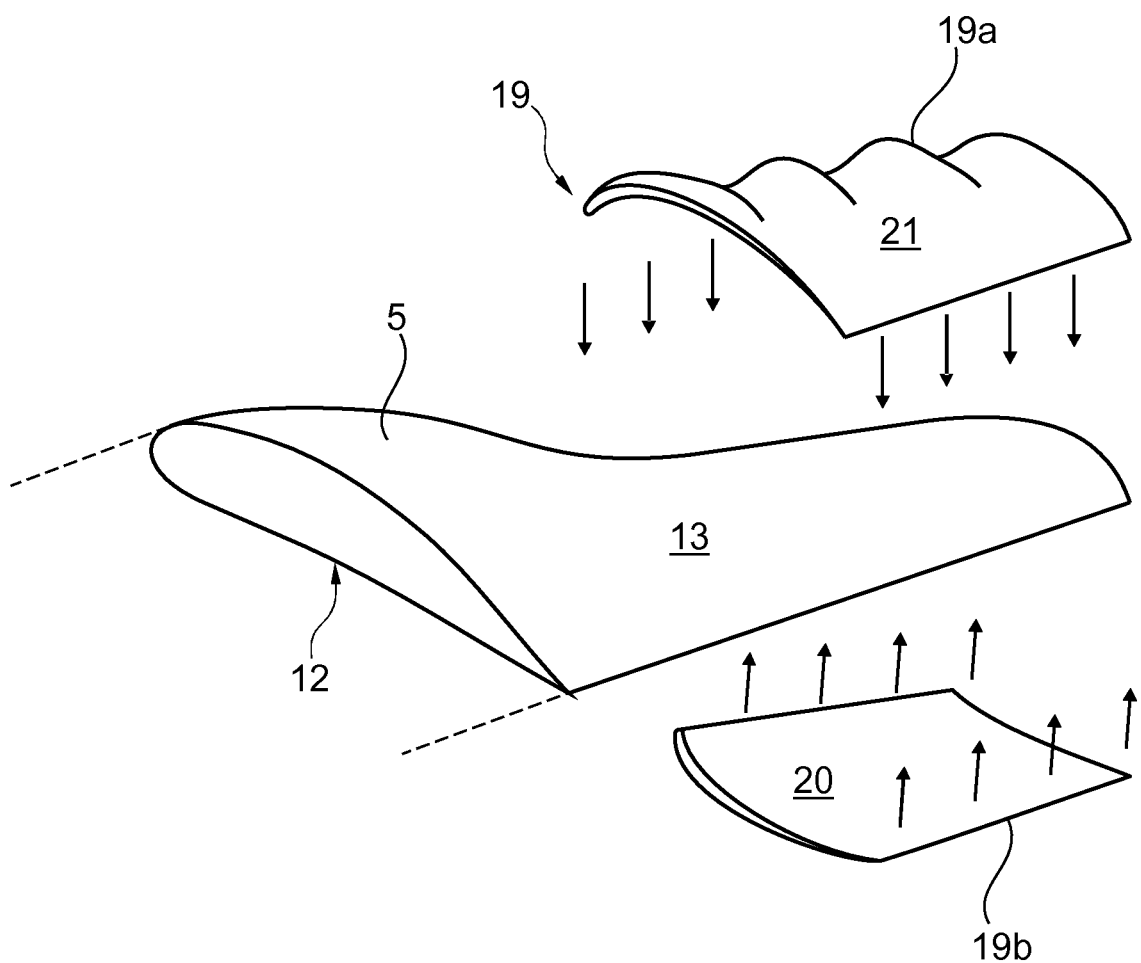
FIG. 3 shows a first exemplary embodiment of two airflow modifying devices attached to the wind turbine blade.
Figure 4:
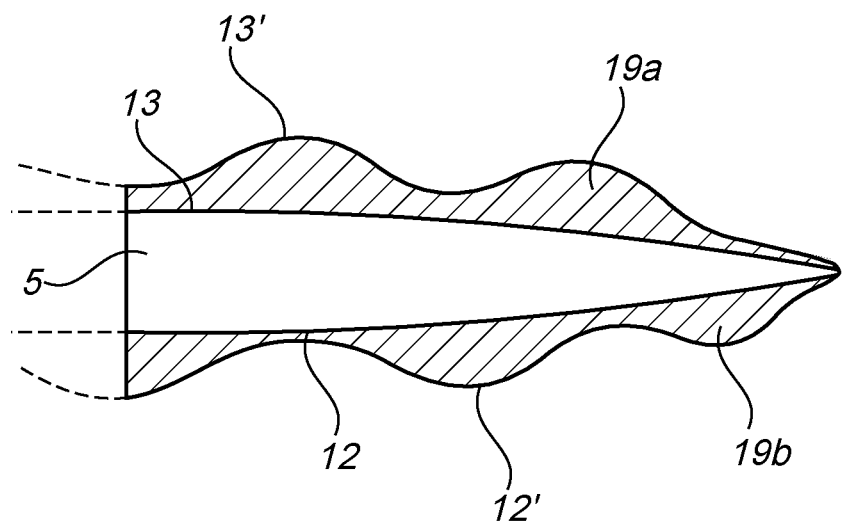
FIG. 4 shows a cross-sectional view of the wind turbine blade with airflow modifying devices of FIG. 3.

FIGS. 3 and 4 show a first exemplary embodiment of a device 19 configured to be attached to the wind turbine blade 5. The wind turbine blade 5 has a base aerodynamic profile, as indicated in FIG. 2, while the device 19 has a complex second profile for modifying this base aerodynamic profile.

Figure 13:
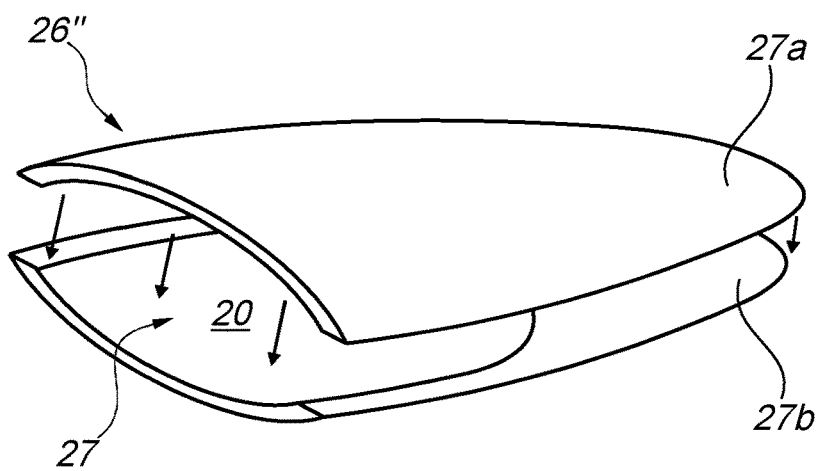
FIG. 13 shows a second alternative embodiment of the airflow modifying device of FIG. 11.

The device 19 in this configuration comprises a first or upper sub-device 19a and a second or lower sub-device 19b, as indicated in FIGS. 3 and 13. The first and second sub-devices 19a, 19b both has a contact surface 20 shaped to substantially follow the matching side surface of the wind turbine blade 5. Both the first and second sub-devices 19a, 19b further has an outer surface 21 shaped to define a modified aerodynamic profile of the wind turbine blade 5.

Here, the first sub-device 19a is arranged on the suction side 13 and the second sub-device 19b is arranged on the pressure side 12, as indicated in FIG. 4. The contact surface of the first sub-device 19a is shaped to follow the surface contour of the suction side 13. The contact surface 20 of the second sub-device 19b is shaped to follow the surface contour of the pressure side 12.

The first and second sub-device 19a, 19b, when attached, together form a wavy aerodynamic profile of the wind turbine blade 5, as indicated in FIG. 4. The outer surface 21 of the first sub-device 19a defines a modified suction side 13' and the outer surface 21 of the second sub-device 19b defines a modified pressure side 12'. As indicated in FIG. 4, the local crests or troughs of the first and second sub-device 19a, 19b are offset relative to each other in the longitudinal or spanwise direction. The local crests or troughs may alternatively be aligned in the longitudinal or spanwise direction.

Figure 5:
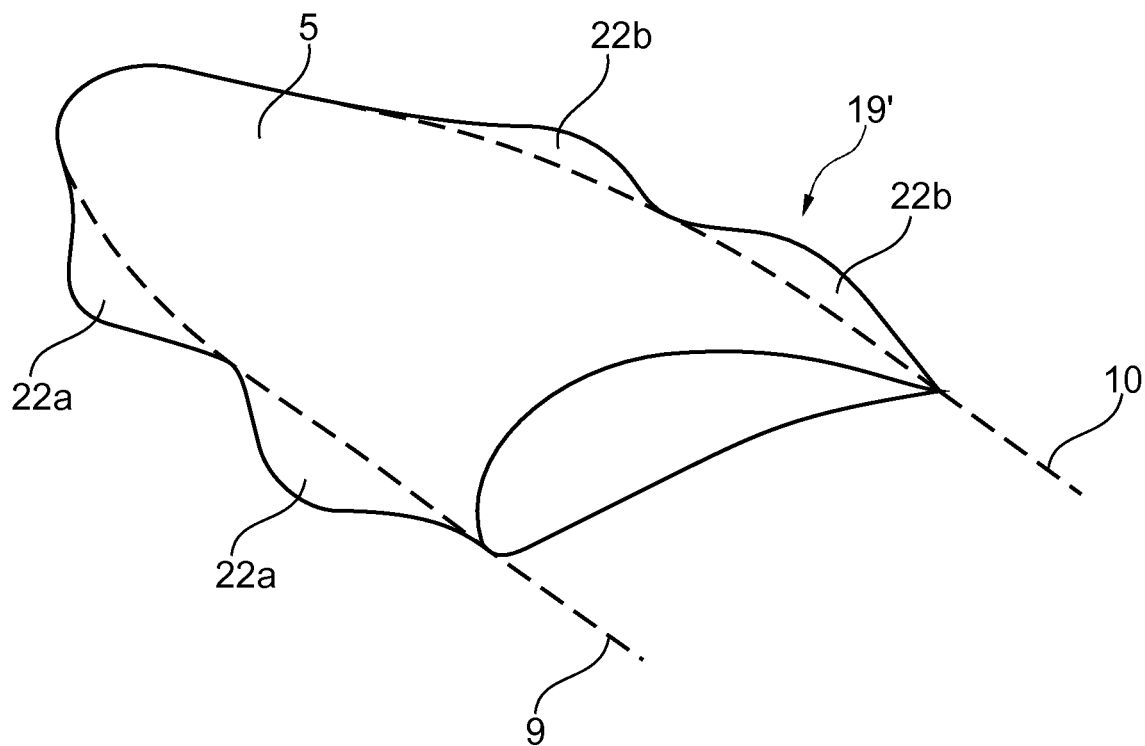
FIG. 5 shows a second exemplary embodiment of the airflow modifying device attached to the wind turbine blade.

FIG. 5 shows a second exemplary embodiment of the device 19' attached to the wind turbine blade 5. Here, the devices 19' are arranged at the leading and trailing edges 9, 10 of the wind turbine blade 5, respectively. The contact surface 20 of each device 19' is shaped to substantially follow the surface contour of the respective leading edge 9 or trailing edge 10.

Here, an array of first devices 22a is arranged at the leading edge 9 and an array of second devices 22b is arranged at the trailing edge 10. The individual first or second devices 22a. 22b are here contacting each other, but may be spaced apart as indicated in FIG. 6.

The first and second devices 22a, 22b are here illustrated as aerodynamic bumps extending in at least the spanwise direction. The bumps are preferably formed as advanced bumps extending in both the spanwise and chordwise directions.

Figure 6:
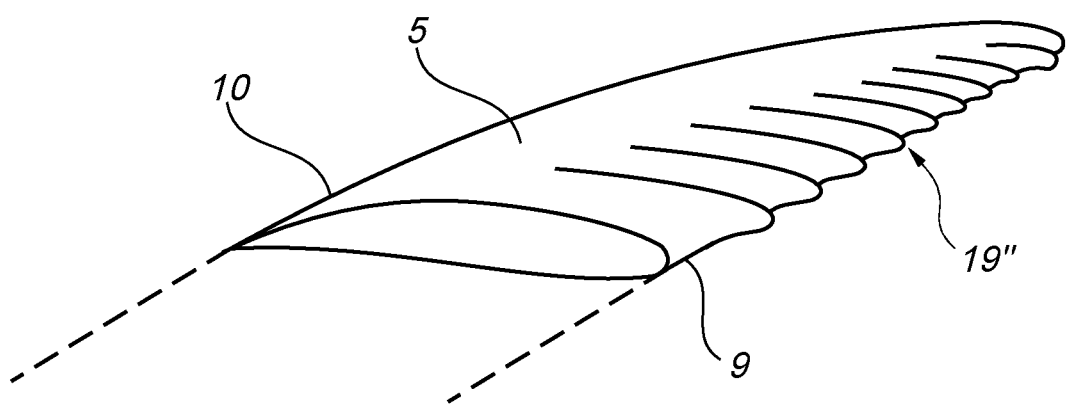
FIG. 6 shows a third exemplary embodiment of the airflow modifying device attached to the wind turbine blade.

FIG. 6 shows a third exemplary embodiment of the device 19" attached to the wind turbine blade 5. Here, the devices 19" are arranged at a leading edge area (shown in FIG. 8) and the contact surface 20 of the device 19" is shaped to substantially follow the surface contour of the leading edge 9 and part of the pressure and suction sides 12, 13.

Figure 7:
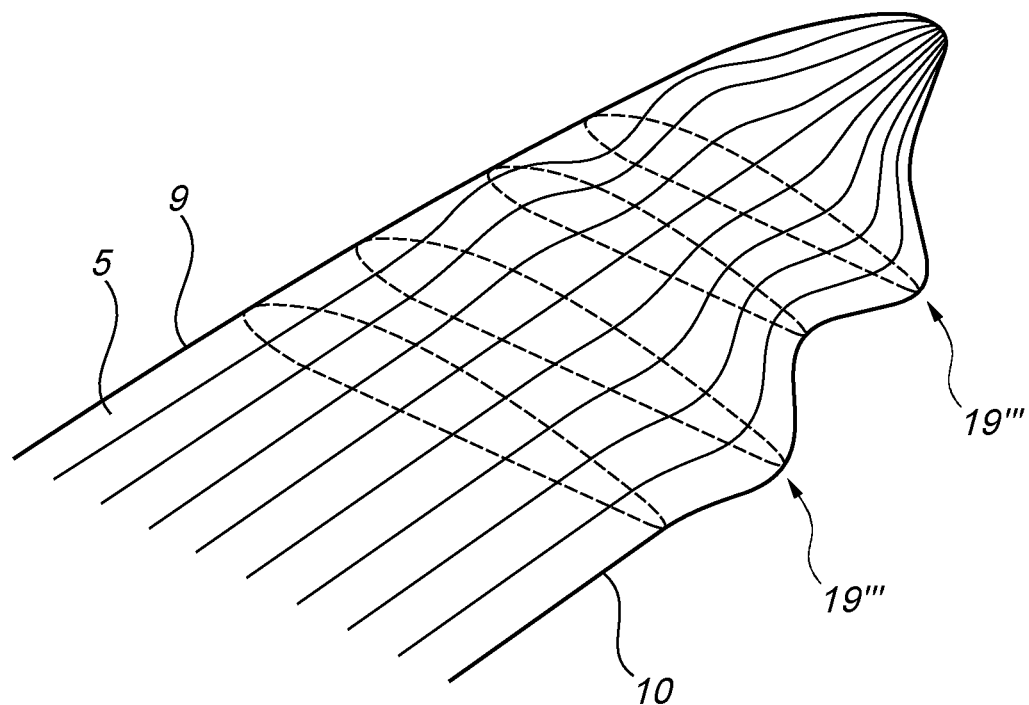
FIG. 7 shows a fourth exemplary embodiment of the airflow modifying device attached to the wind turbine blade.

Here, an array of devices 19" is arranged along the leading edge area 9 where the individual devices 19" are spaced apart. The devices 19" are here illustrated as aerodynamic tubercles extending in at least the chordwise direction. The tubercles are preferably formed as advanced tubercles extending in both the spanwise and chordwise directions FIG. 7 shows a fourth exemplary embodiment of the device 19''' attached to the wind turbine blade 5. Here, a plurality of devices 19''' are arranged at the trailing edge area (shown in FIG. 8) and the contact surface 20 of the devices 19''' is shaped to substantially follow the surface contours of the trailing edge and part of the pressure and suction sides 12, 13.

The second profile of the device 19''' tapers along the pressure and suction sides 12, 13 from the trailing edge 10 towards the leading edge 9. The devices 19''' are here illustrated as turbulators extending in at least the chordwise direction. The turbulators are preferably formed as advanced turbulators extending in both the spanwise and chordwise directions.

Figure 8:
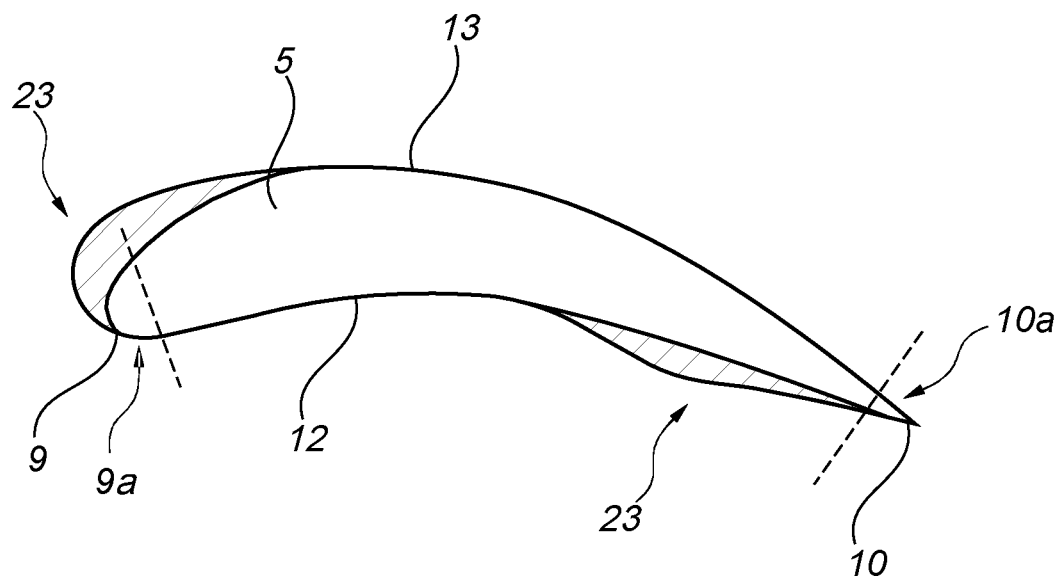
FIG. 8 shows a cross-sectional view of two alternative embodiments of the airflow modifying device attached to the wind turbine blade.

FIG. 8 shows a cross-sectional view of two alternative embodiments of the device 23 attached to the wind turbine blade 5. In one alternative embodiment, the device 23 is arranged on the pressure side 12 and positioned towards the trailing edge 10 or the trailing edge area 10a (indicated by dashed line). In another alternative embodiment, the device is arranged on the suction side 13 and positioned towards the leading edge 9 or the leading edge area 9a (indicated by dashed line).

The contact surface 20 of the device 23 is shaped to substantially follow the surface contour of the pressure or suction side 12, 13 at its installation position. Here, the second profile of the device 23 is configured to improve the lift-to-drag ratio of the wind turbine blade 5.

Figure 9:
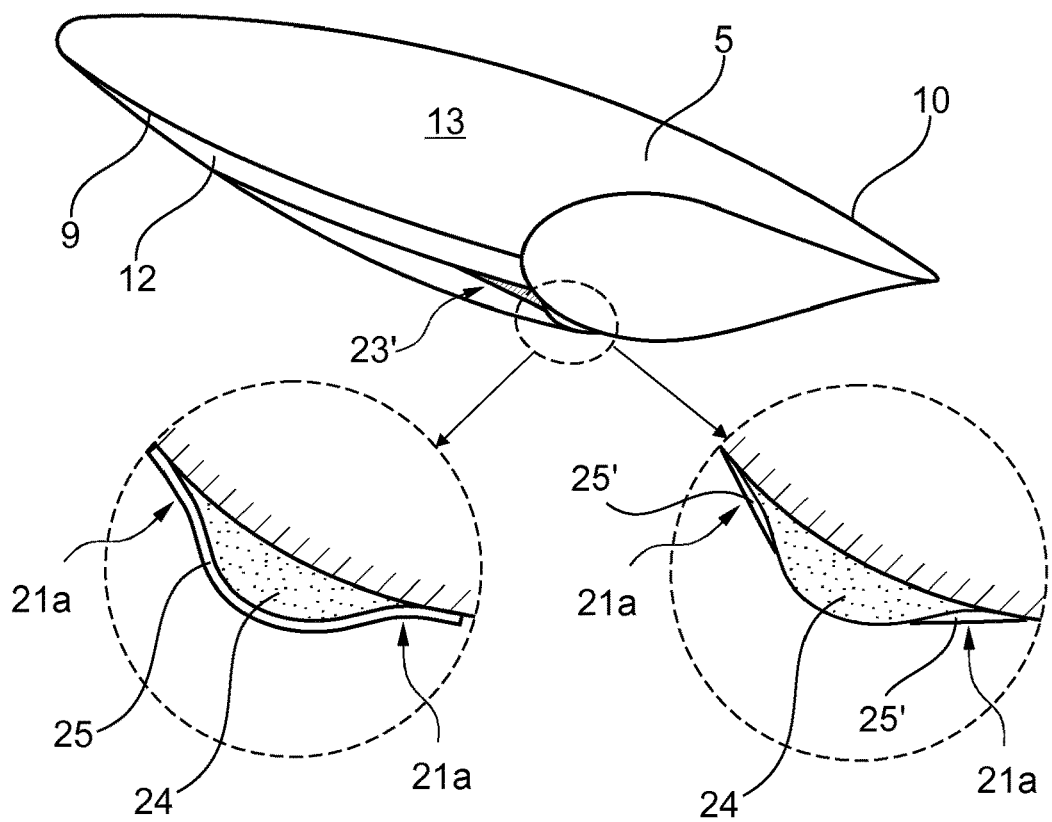
FIG. 9 shows a fifth exemplary embodiment of the airflow modifying device attached to the wind turbine blade.
Figure 10:
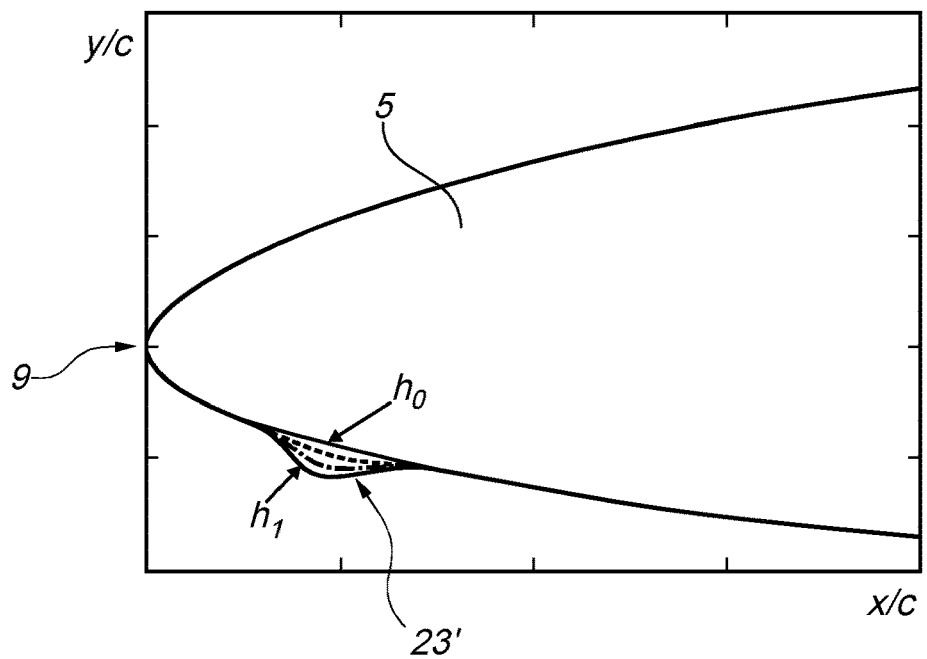
FIG. 10 shows the airflow modifying device of FIG. 9 with different heights.

FIGS. 9 and 10 show a fifth exemplary embodiment of the device 23' attached to the wind turbine blade 5. Here, the device 23' is arranged on the pressure side 12 and located towards the leading edge 9, as indicated in FIG. 9.

The second profile of the device 23' is shaped as a bump having an advanced aerodynamic profile extending in the spanwise direction for improving the lift-to-drag ratio of the wind turbine blade 5. The device 23, 23' has a local height $h_1$ measured from the respective side surface (marked $h_0$), e.g. the pressure side 12, of the wind turbine blade 5 and to a tip point of the device 23, 23'. The local height may be adapted to the base aerodynamic profile and/or geometric properties of the wind turbine blade 5, as indicated in FIG. 10.

The graph of FIG. 10 shows the wind turbine blade 5 with the device 23' having different heights. The x-axis denotes the relative chord length (x/c) measured from the leading edge 9. The y-axis denotes the relative position (y/c) in a flapwise direction measured from the leading edge 9.

The body 24 of the device 19, 19', 19", 19''', 23, 23' is made of a light-weight material, such as a foam material. At least the outer surfaces 21 of the body 24 are covered by a protective layer 25 in the form of a coating or a layer or laminate of a fibre material. The device 19, 19'. 19", 19''', 23, 23' is attached by overlamination where the protective layer 25 extends over the entire outer surface 21 and further over the transition areas 21a, as illustrated in FIG. 9. Alternatively, the protective layer 25' extends over just the transition areas 21a as also illustrated in FIG. 9. Optionally, a coating is applied between the protective layers 25'.

Optionally, the protective layers 25, 25' and/or the body 24 has a tapered edge profile, as further illustrated in FIG. 9.

Figure 11:
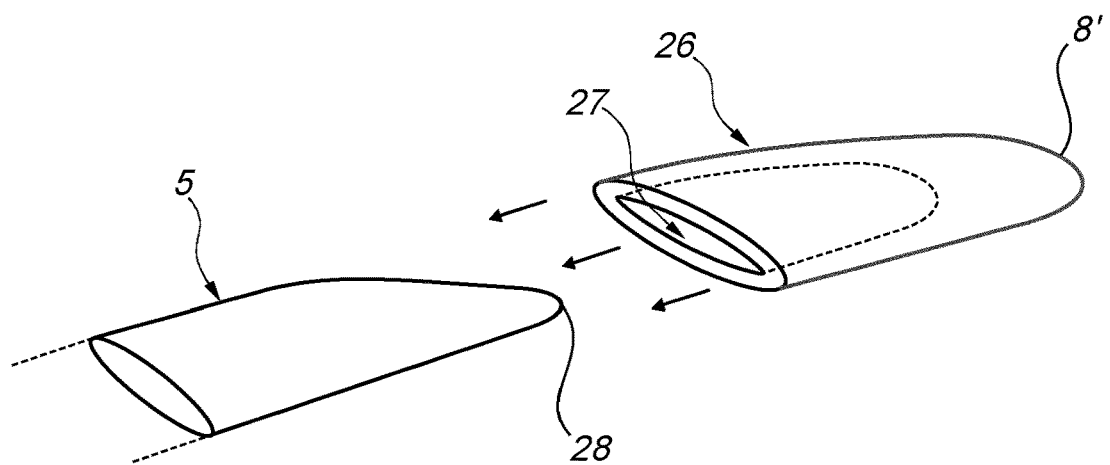
FIG. 11 shows a sixth exemplary embodiment of the airflow modifying device attached to the wind turbine blade.

FIG. 11 shows a sixth exemplary embodiment of the device 26 attached to the wind turbine blade 5. The device 26 is arranged at the tip end 8 of the wind turbine blade 5.

The device 26 is here formed by a single continuous element, wherein the device comprises an inner chamber 27 defined by the contact surfaces 20. The inner chamber 27 is shaped to substantially follow the profile of the original tip end 28 of the wind turbine blade 5. The inner chamber 27 is configured to receive and thus enclose the original tip end 28 when attached.

Figure 12:
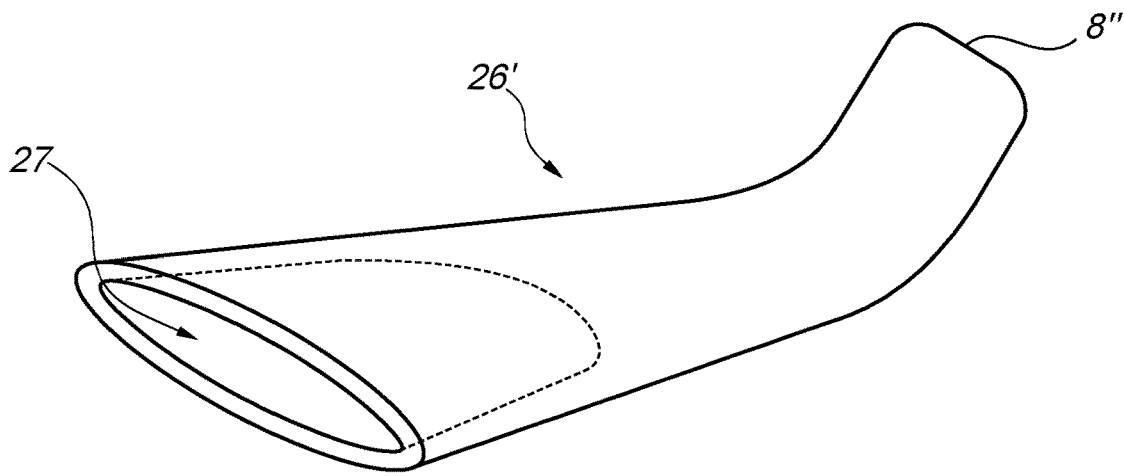
FIG. 12 shows a first alternative embodiment of the airflow modifying device of FIG. 11.

The profile of the device 26 is shaped to form a tip end profile for attachment to the wind turbine blade 5. Here, the device 26 forms an extended tip end profile, wherein the tip end of the device 26 defines an extended tip end 8' of the wind turbine blade 5. FIG. 12 shows a first alternative embodiment of the device 26', wherein the device 26' forms a modified tip end profile for altering the profile of the original tip end 28. Here, the device 26' is shaped as a winglet, wherein the tip end 8" bends to the suction side 13, alternatively towards the pressure side 12.

FIG. 13 shows a second alternative embodiment of the device 26", wherein the device 26" comprises a first sub-device 29a and a second sub-device 29b.

Here, the first sub-device 29a is configured for attachment to the suction side 13 and the second sub-device 29b is configured for attachment to the pressure side 12. The contact surface 20 of the first sub-device 29a is shaped to follow the surface contour of the suction side 13 of the original tip end 28. The contact surface 20 of the second sub-device 29b is shaped to follow the surface contour of the pressure side 12 of the original tip end 28.

Figure 14:
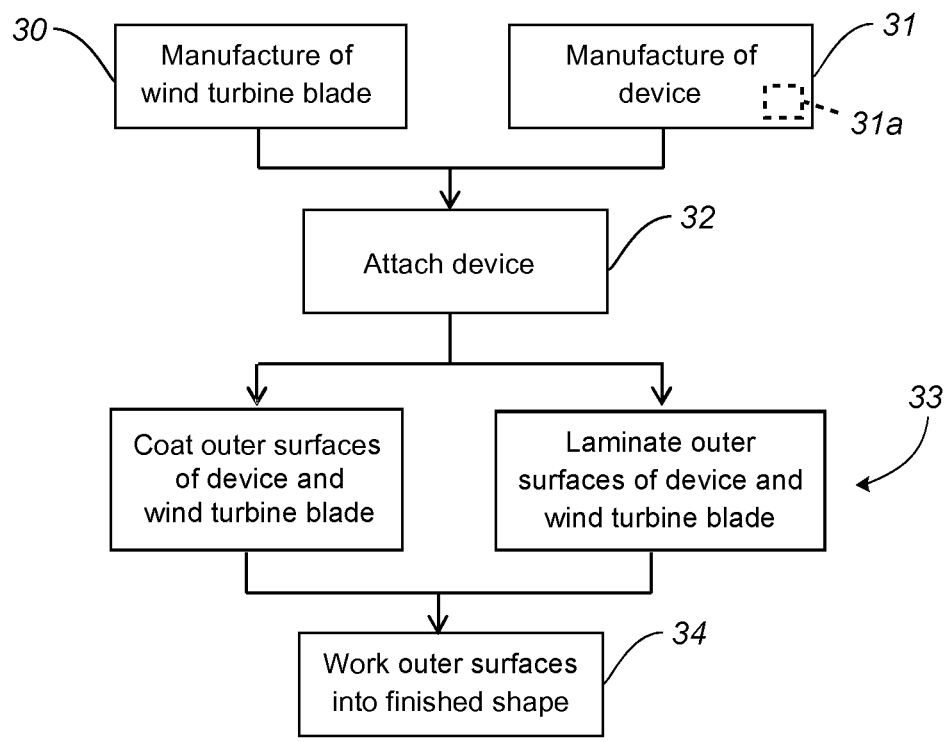
FIG. 14 shows a first method of manufacturing the wind turbine blade according to the invention.

FIG. 14 shows a first method of manufacturing a modified wind turbine blade according to the invention.

The wind turbine blade 5 is manufactured 30 with a base aerodynamic profile by initially laying up a number of layers of a fibre material in a mould. Optionally, a core material is placed on top of these layers, after which a second number of layers of a fibre material are laid up on top of the core material. A resin is then introduced into the layers of fibre material, e.g. using a vacuum infusion process. Finally, the resin is cured to form a first blade shell part. The process is then repeated to form a second blade shell part.

The first and second blade shell parts are then joined together, e.g. using an adhesive, to form the wind turbine blade 5.

The device 19, 19', 19", 19''', 23, 23' is manufactured 31 in a separate process using 3D-printing, alternatively 3D-machining of a base element 31a.

The device 19, 19', 19", 19''', 23, 23' is then arranged on and attached 32 to the wind turbine blade 5. If an array of devices 19, 19', 19", 19''', 23, 23' are arranged on the wind turbine blade 5, then the individual devices are optionally further attached to each other. The attachment is optionally performed by use of an adhesive arranged between the contact surface 20 and the respective side surface of the wind turbine blade 5.

A protective coating is applied 33 to the outer surface 21 of the devices 19, 19', 19", 19''', 23, 23' and at least a portion of the respective side surface of the wind turbine blade 5. Alternatively, layers of a laminate of fibre material is applied 33 to the outer surface 21 of the devices 19, 19', 19", 19''', 23, 23' and further to a portion of the respective side surface of the wind turbine blade 5.

The outer surface 21 of the device 19, 19', 19", 19''', 23, 23' and all side surfaces of the wind turbine blade 5 are finally worked 34 in a combined step into their finished shape.

Figure 15:
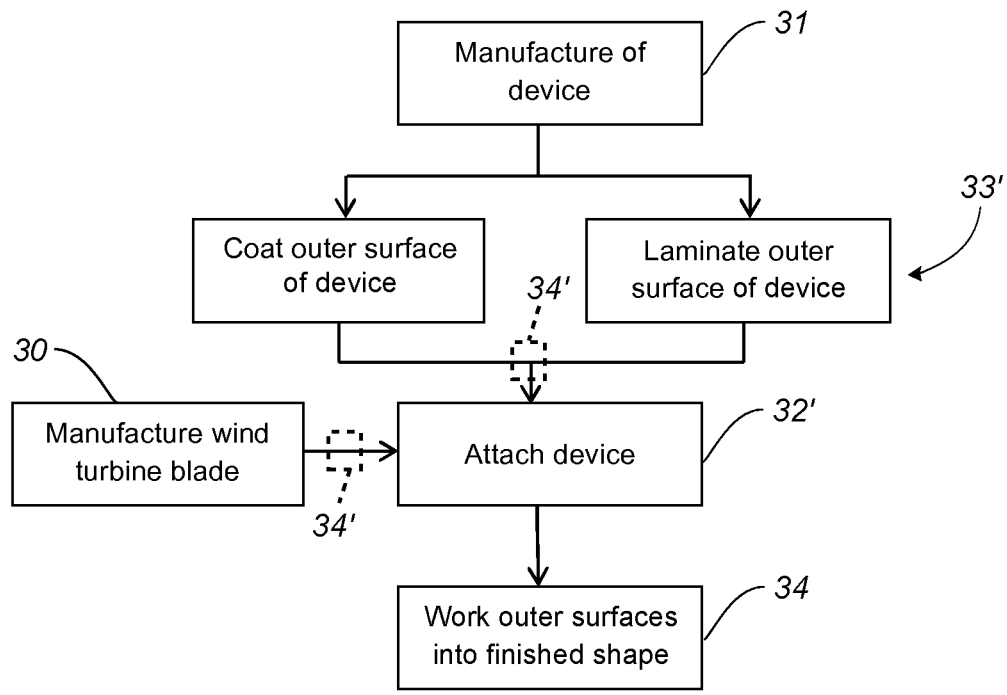
FIG. 15 shows a second method of manufacturing the wind turbine blade.

FIG. 15 shows a second method of manufacturing the modified wind turbine blade. The device 19, 19', 19", 19''', 23, 23' is manufactured 31 as mentioned above. After which, the entire or most of the body of the device 19, 19', 19", 19''', 23, 23' is covered by applying 33' a coating, or alternatively a layers of a laminate of fibre material, to the outer surface 21 of the device 19, 19', 19", 19''', 23, 23'.

The wind turbine blade 5 is separately manufactured as mentioned above.

The device 19, 19', 19", 19''', 23, 23' is then arranged on and attached 32' to the wind turbine blade 5. If an array of devices 19, 19', 19", 19''', 23, 23' are arranged on the wind turbine blade 5, then the individual devices are optionally further attached to each other. The attachment is optionally performed by applying layers of a laminate of fibre material along the transition area 21a between the respective device and the wind turbine blade 5. A resin is then introduced into the fibre material, and finally cured.

The outer surface 21 of the device 19, 19', 19". 19''', 23, 23' and all side surfaces of the wind turbine blade 5 are finally worked in a combined step into their finished shape.

Alternatively, the side surfaces of the wind turbine blade 5 are worked 34' into their finished shape prior to attachment of the device 19, 19', 19", 19''', 23, 23'. Likewise, the outer surfaces 21 of the device 19, 19', 19", 19'''. 23, 23' are alternatively worked 34' into their finished shape before attachment. Optionally, the outer surface of the transition area 21a is worked into its finished shape after attachment.

The abovementioned embodiments may be combined in any combinations without deviating from the present invention.

The invention claimed is:

1. A method of manufacturing a device (19) for modifying an aerodynamic profile of a wind turbine blade (5), the wind turbine blade (5) having a base aerodynamic profile, wherein the method comprises:
   manufacturing a body (24) of the device (19) having at least one outer surface (21) and at least one contact surface (20), the at least one contact surface (20) is shaped to substantially follow the contour of said base aerodynamic profile, when attached, wherein the body (24) forms a complex profile extending in a chordwise direction and further in a longitudinal direction, the complex profile is configured to modify said base aerodynamic profile of the wind turbine blade (5), when attached, and wherein the complex profile has concave and convex curvature in the chordwise and longitudinal directions; and
   applying (33') at least one layer of fibre material or a coating over at least a portion of said at least one outer surface (21) of the body (24) to form the device (19), the device (19) being configured to be attached to the wind turbine blade (5),
   wherein said body (24) is manufactured (31) by three-dimensional printing and/or by three-dimensional machining of a base element (31a) of said device (19).

2. The method according to claim 1, characterised in that said body (24) is manufactured by three-dimensional printing of the base element (31a) of the device (19), which is substantially three-dimensional machined into the complex profile.

3. The method according to claim 1, characterised in that said at least one layer of fibre material is infused or injected with a thermoplastic binder or a thermoset resin.

4. The method according to claim 1, characterised in that a coating is further applied over said at least one layer.

5. The method according to claim 1, wherein the complex profile of the body (24) is a three-dimensional profile.

6. The device according to claim 5, wherein the complex profile of the body (24) has a substantially non-constant surface gradient along both the chordwise length and longitudinal length of the body.

7. A device (19) for modifying an aerodynamic profile of a wind turbine blade (5), the device (19) comprising a body (24) forming a complex profile extending in a chordwise direction and further in a longitudinal direction, the body (24) has at least one outer surface (21) and at least one contact surface (20), the device (19) is configured to modify a base aerodynamic profile of the wind turbine blade (5), when attached, wherein the at least one contact surface (20) is shaped to substantially follow a contour of said base aerodynamic profile of the wind turbine blade (5), characterised in that at least one layer of fibre material or a coating extends over at least a portion of said at least one outer surface (21) of the body (24), and wherein the complex profile has concave and convex curvature in the chordwise and longitudinal directions.

8. The device (19) according to claim 7, characterised in that said device (19) comprises a first sub-device (19*a*) and a second sub-device (19*b*), wherein the first sub-device (19*a*) and the second sub-device (19*b*) are configured to be jointed together and/or to be attached to the wind turbine blade (5).

9. A method of modifying an aerodynamic profile of a wind turbine blade (5), the wind turbine blade (5) having a length of at least 35 meters measured between a blade root (7) and a tip end (8), wherein the method comprising the steps of:
- laying up at least one layer of a fibre material in a mould;
- introducing a resin into said at least one layer of fibre material;
- substantially curing said resin in the fibre material to form at least one cured blade part of the wind turbine blade (5);
- working (34) a side surface of said at least one cured blade part into a finished outer surface defining a pressure or suction side (12, 13) of the wind turbine blade (5); and
- attaching at least one device (19) according to claim 7 to the at least one cured blade part by applying at least one layer of fibre material over at least a portion of the at least one outer surface (21) and further over a portion of the side surface of the at least one cured blade part, wherein said at least one layer of fibre material is infused or injected with a thermoplastic binder or a thermoset resin.

10. The method according to claim 9, characterised in that said at least one cured blade part comprises a first blade part and a second blade part, wherein the at least one device (19) is attached before or after joining said first and second blade parts.

11. The method according to claim 9, characterised in that said at least one device (19) comprises a first sub-device (19*a*) and a second sub-device (19*b*), wherein the first sub-device (19*a*) is arranged on the suction side (13) and the second sub-device (19*b*) is arranged on the pressure side (12).

12. The device according to claim 7, wherein the complex profile of the body (24) is a three-dimensional profile.

13. The device according to claim 12, wherein the complex profile of the body (24) has a substantially non-constant surface gradient along both the chordwise length and longitudinal length of the body.

14. A wind turbine blade for a wind turbine, the wind turbine blade (5) extending in a longitudinal direction from a blade root (7) to a tip end (8) and further in a transverse direction from a leading edge (9) to a trailing edge (10), the wind turbine blade (5) having a length of at least 35 meters measured between the blade root (7) and the tip end (8), wherein the wind turbine blade (5) comprising an aerodynamic profile which defines at least one side surface arranged between said leading edge (9) and said trailing edge (10), wherein a number of devices (19) is attached to the wind turbine blade (19), each device (19) comprises a body (24) forming a profile configured to modify the base aerodynamic profile of the wind turbine blade (5), the body defines at least one outer surface (21) facing away from said at least one side surface and at least one contact surface (20) facing said at least one side surface, characterised in that said aerodynamic profile is a base aerodynamic profile, and at least one of said devices (19) is configured according to claim 7.

15. The wind turbine blade according to claim 14, characterised in that said at least one of the devices (19) is positioned between 0% to 50% of the chord length from the leading edge (9).

16. The wind turbine blade according to claim 14, characterised in that said number of devices comprises an array of devices (19), wherein said array of devices (19) extends along the leading edge (9) or the at least one side surface.

17. The wind turbine blade according to claim 14, characterised in that said number of devices comprises a device (26) arranged at the tip end (8), wherein the at least one contact surface (20) is shaped to enclose an original tip end (28) of the wind turbine blade (5), and the complex profile is shaped to form either an extended tip end profile or a modified tip end profile.

\* \* \* \* \*